United States Patent
Hsieh et al.

(10) Patent No.: US 9,251,569 B2
(45) Date of Patent: Feb. 2, 2016

(54) REMOVING NOISE FROM AN IMAGE VIA EFFICIENT PATCH DISTANCE COMPUTATIONS

(71) Applicant: Adobe Systems Incorporated, San Jose, CA (US)

(72) Inventors: Chih-Yao Hsieh, San Jose, CA (US); Yuyan Song, Sunnyvale, CA (US); Zhe Lin, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 14/022,462

(22) Filed: Sep. 10, 2013

(65) Prior Publication Data

US 2015/0071561 A1 Mar. 12, 2015

(51) Int. Cl.
*G06K 9/40* (2006.01)
*G06T 5/00* (2006.01)
*G06T 5/20* (2006.01)

(52) U.S. Cl.
CPC . *G06T 5/002* (2013.01); *G06T 5/20* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 5,594,807 A | * | 1/1997 | Liu | 382/128 |
| 6,317,521 B1 | * | 11/2001 | Gallagher et al. | 382/260 |
| 7,228,004 B2 | * | 6/2007 | Gallagher et al. | 382/274 |
| 8,768,046 B2 | * | 7/2014 | Ernst et al. | 382/154 |
| 2004/0047514 A1 | * | 3/2004 | Gallagher et al. | 382/270 |
| 2005/0147316 A1 | * | 7/2005 | Deshpande | 382/261 |
| 2010/0303380 A1 | * | 12/2010 | Demandolx et al. | 382/275 |
| 2011/0150332 A1 | * | 6/2011 | Sibiryakov et al. | 382/167 |
| 2012/0281923 A1 | * | 11/2012 | Irani et al. | 382/218 |

OTHER PUBLICATIONS

J. Becker, M. Platzner, S. Vernalde (Eds.): Minimum Sum of Absolute Diffrences Implementation in a Single FPGA Device, FPL 2004, LNCS 3203, pp. 986-990, 2004. Springer-Verlag Berlin Heidelberg 2004.*

Buades et al."A Review of Image Denoising Algorithms, with a new one," Multiscale Model Sinuit, vol. 4, No. 2 pp. 490-494 @ 2005 Society for Industrial and Applied Mathematics.

* cited by examiner

*Primary Examiner* — Andrae S Allison
(74) *Attorney, Agent, or Firm* — Wolfe-SBMC (57) ABSTRACT

Systems and methods herein provide for reduced computations in image processing and a more efficient way of computing distances between patches in patch-based image denoising. One method is operable within a processing system to remove noise from a digital image by generating a plurality of lookup tables of pixel values based on a plurality of comparisons of the digital image to offsets of the digital image, generating integral images from the lookup tables, and computing distances between patches of pixels in the digital image from the integral images. The method also includes computing weights for the patches of pixels in the digital image based on the computed distances and applying the weights to pixels in the digital image on a patch-by-patch basis to restore values of the pixels.

25 Claims, 9 Drawing Sheets

REMOVING NOISE FROM AN IMAGE VIA EFFICIENT PATCH DISTANCE COMPUTATIONS

FIELD OF THE INVENTION

The invention generally relates to the field of patch-based image processing.

BACKGROUND

Patch-based image denoising is a process of operating on a select set, or a "patch", of pixels in an image at a time (also known as a "window" of pixels) to remove/replace noise from the pixels in the image. For example, an image may be corrupted with some level of Additive White Gaussian Noise (AWGN) creating a sort of "salt and pepper" look in the image. One patch of pixels is selected at a time to denoise the image by adjusting a grayscale vector of a center pixel value of the patch. In doing so, a series of comparable "search patches" is selected from the image and compared to the patch undergoing denoising. Based on distances from the patch being processed, the search patches are weighted and applied to the center pixel of the patch to linearly adjust the grayscale value of the center pixel. This process is commonly referred to as a Non Local Means (NLM) denoising process and it is generally applied to each pixel in the image to restore the image to its original color values.

NLM and other similarly complex processes, such as Block-Matching and 3D filtering (BM3D), can be applied to images in other ways to improve image quality. For example, these processes can be used to "upscale" a lower resolution image by providing comparable pixels to regions in the image. In other words, when a lower resolution image is upscaled to a higher resolution image (i.e., an image with more pixels), the extra pixels need to be created. Patch-based imaging processes can be used to create these extra pixels by locating pixels in regions of the image and inserting the comparable pixels.

Again though, current patch-based processing uses distances between comparable patches to weight a pixel under consideration. Patches that are farther away from a pixel being operated on may have less effect on visual appearance and are therefore given less weight in adjusting the pixel. But, the current patch-based processes determine the distances in a computationally intensive and inefficient manner. For example, in an image where there are "N" pixels and there are "P" patches being used to process the image with "K" pixels in each patch, current patch-based processing performs N×P×K computations. When N and P are relatively large numbers as is typically the case with high resolution images (e.g., images having N and possibly P values in the millions), current patch based processing uses substantial processor and memory capabilities. Such may be of lesser concern in larger computing systems. But, many mobile platforms, such as smart phones and tablet computers, have limited computing resources. In any case, reducing the number of computations in patch-based image processing conserves power and allows processing resources to be distributed to other tasks.

SUMMARY

Systems and methods herein provide for reduced computations in patch-based image processing and a more efficient way of computing distances between patches. In one embodiment, a method of removing noise from a digital image includes generating a plurality of lookup tables of pixel values based on a plurality of comparisons of the digital image to offsets of the digital image, generating integral images from the lookup tables, and computing distances between patches of pixels in the digital image from the integral images. The method also includes computing weights for the patches of pixels in the digital image based on the computed distances and applying the weights to pixels in the digital image on a patch-by-patch basis to restore values of the pixels (e.g., by adjusting a grayscale vector of pixels in a color image or by adjusting gray values of pixels in a monochrome image). This process generally reduces the computational complexity of patch-based image processing by a factor of P (i.e., the number of patches being used to process the image), and thus reduces a memory footprint and power consumption related to such processing.

The various embodiments disclosed herein may be implemented in a variety of ways as a matter of design choice. For example, the embodiments may take the form of computer hardware, software, firmware, or combinations thereof. Other exemplary embodiments are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
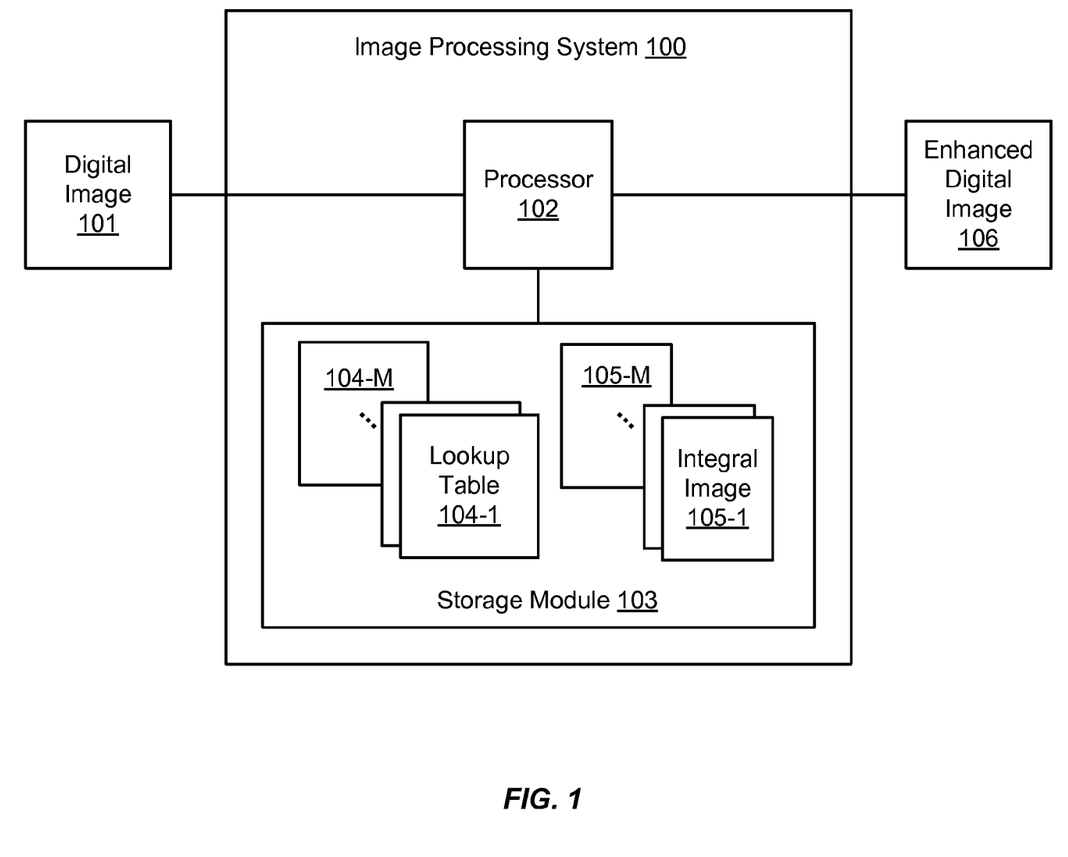
FIG. 1 is a block diagram of an exemplary image processing system.

FIG. 1 is a block diagram of an exemplary image processing system 100. The image processing system 100 is operable to receive a digital image 101 and perform patch-based image processing on the digital image 101 to remove noise from the digital image 101. This process produces an enhanced digital image 106 where original color values of the digital image 101 are restored. In doing so, the image processing system 100 may generate offset images to compute lookup tables 104-1-104-M of pixel values (e.g., difference values) based on comparisons of the digital image 101 to the offset images (where reference "M" is merely intended to represent an integer greater than "1" and not necessarily equal to any other M reference disclosed herein). The image processing system 100 may then generate integral images 105-1-105-M from the lookup tables 104-1-104-M to compute distances between patches of selected pixels. These distance computations can be used to weight the patches of pixels when restoring a particular pixel in the digital image 101 (e.g., by adjusting a grayscale vector of the pixel in a color image or by adjusting a gray value of the pixel in a monochrome image) and thereby remove noise from the individual pixel.

The image processing system 100 includes a processor 102 that operates on patches of pixels in the digital image 101 to remove the noise from the digital image 101. The image processing system 100 also includes a storage module 103 that is operable to at least store the integral images 105-1-105-M for subsequent pixel weighting calculations.

The image processing system 100 may be implemented in any combination of hardware and software. For example, the image processing system 100 may be a computer system configured with software that directs the processor 102 to remove noise from the digital image 101. As the patch-based image processing perform herein is more efficient, the image processing system 100 may be configured on platforms with lesser processing capabilities, such as tablet computers, smart phones, and the like. The processor 102 may be any type of processor suitable for processing digital information including, for example, digital signal processors and general purpose processors. The storage module 103 is any device, system, software, or combination thereof operable to retain digital data such as the lookup tables 104-1-104-M and the integral images 105-1-105-M. Examples of such include disk drives, random access memory, flash memory, and the like. One exemplary process 200 of the image processing system 100 is now discussed with respect to the flowchart of FIG. 2.

Figure 2:
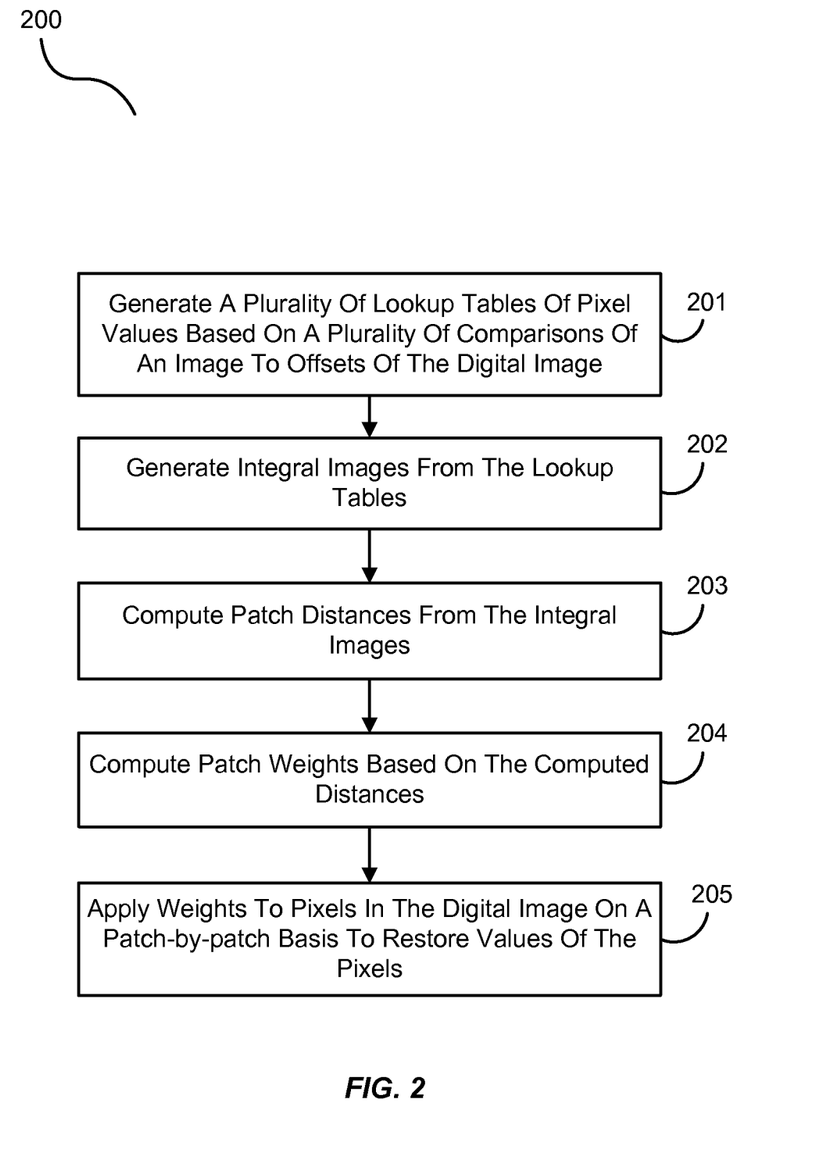
FIG. 2 is a flowchart of an exemplary denoising process of the system of FIG. 1.

In FIG. 2, the process 200 initiates with the processor 102 operating on the digital image 101 to generate a plurality of lookup tables 104-1-104-M of pixel values based on a plurality of comparisons of the digital image 101 to offsets of the digital image 101, in the process element 201. For example, the processor 102 may pixelwise shift the digital image 101 a number of times. Each shift of the digital image 101 results in an offset image that is compared to the digital image 101 to generate a table of pixel values between the offset image and the digital image 101 (e.g., difference values including squared or absolute values). Thus, there is generally one lookup table 104 of pixel values for each pixelwise shift of the digital image 101.

With the lookup tables 104-1-104-M established, the processor 102 generates the integral images 105-1-105-M, in the process element 202. The integral images 105-1-105-M are generally the result of summations of previous pixels in an image. For example, a comparison of an x by y pixel digital image 101 to an x by y pixel offset image results in an x by y number of differences in the lookup table 104 (x and y also being integers greater than "1" and not necessarily equal to one another). The pixel values in the lookup table 104 are then summed to produce an integral image 105 of the same x by y size. Details regarding the computations of the offset images, lookup tables 104, and the integral image 105 are shown and described in greater detail below in FIGS. 3-9.

Once the integral images 105-1-105-M are generated, the processor 102 computes patch distances from the integral images 105-1-105-M, in the process element 203. In doing so, the processor 102 may select patches from the original digital image 101 and compute distances between the patches using corner pixel values of a patch in the integral image 105. These patch distances may be stored as maps in the storage module 103 for subsequent use in pixel weighting. For example, when the processor 102 computes a patch distance between a particular patch of pixels and a pixel being processed, that distance may be used to quickly compute a weight or an effect that patch of pixels has on the pixel being processed in the process element 204. Patches that are farther away from the pixel being processed have less weight than closer patches. The processor 102 then applies the weights to pixels in the digital image 101 on a patch-by-patch basis to restore the pixels, in the process element 205.

Although shown and described in a particular number and order of process elements, the invention is not intended to be limited to the illustrated flowchart. Some process elements may be rearranged and performed alternative order. Additionally, the number of patches and even the size and shape of the patch that is selected for processing should not be limited to any number, size, or shape disclosed herein. Patch sizes in the disclosed patch-based denoising processes can be any size/shape subject to design choice. FIGS. 4-9 provide additional details regarding distance computations and are now discussed with respect to the process 300 of the flowchart of FIG. 3.

Figure 3:
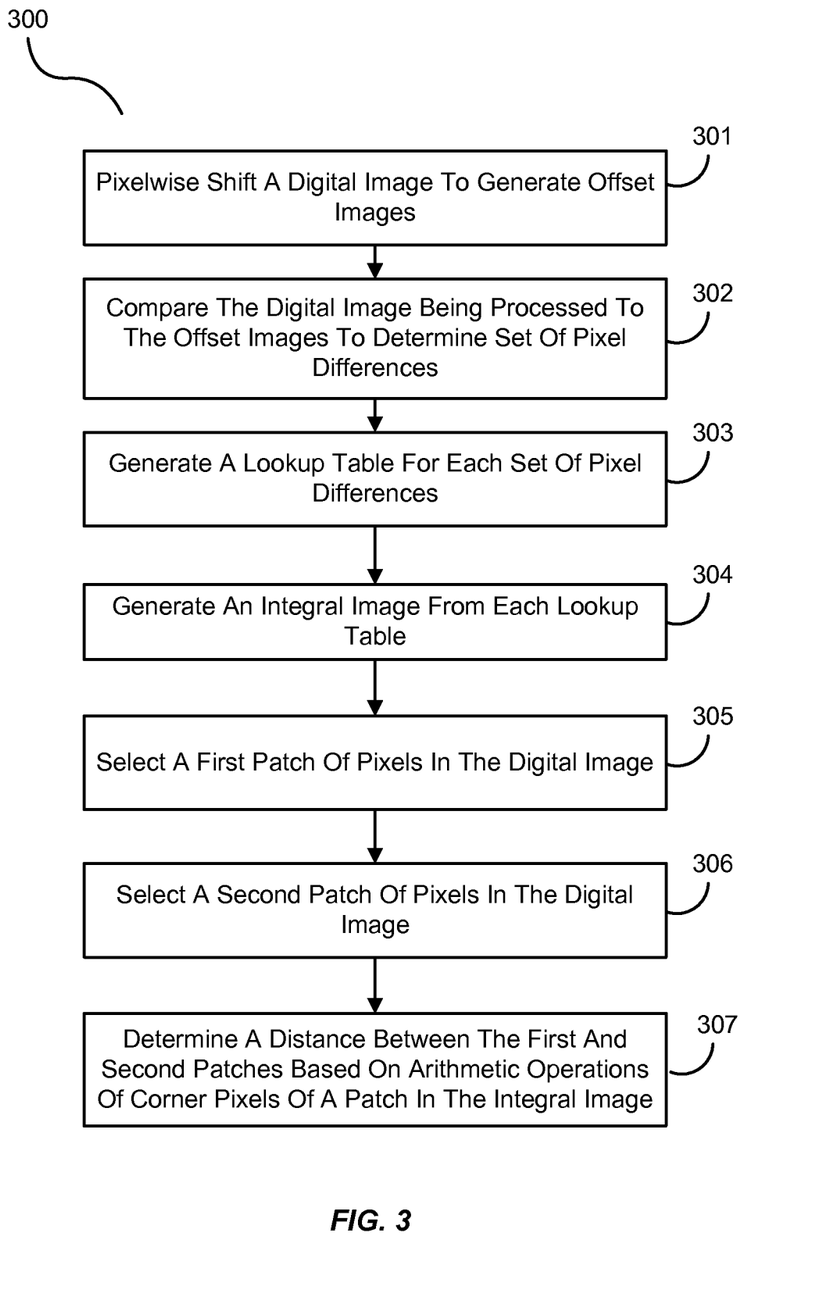
FIG. 3 another exemplary process of the system of FIG. 1 for performing patch-based distance computations.
Figure 4:
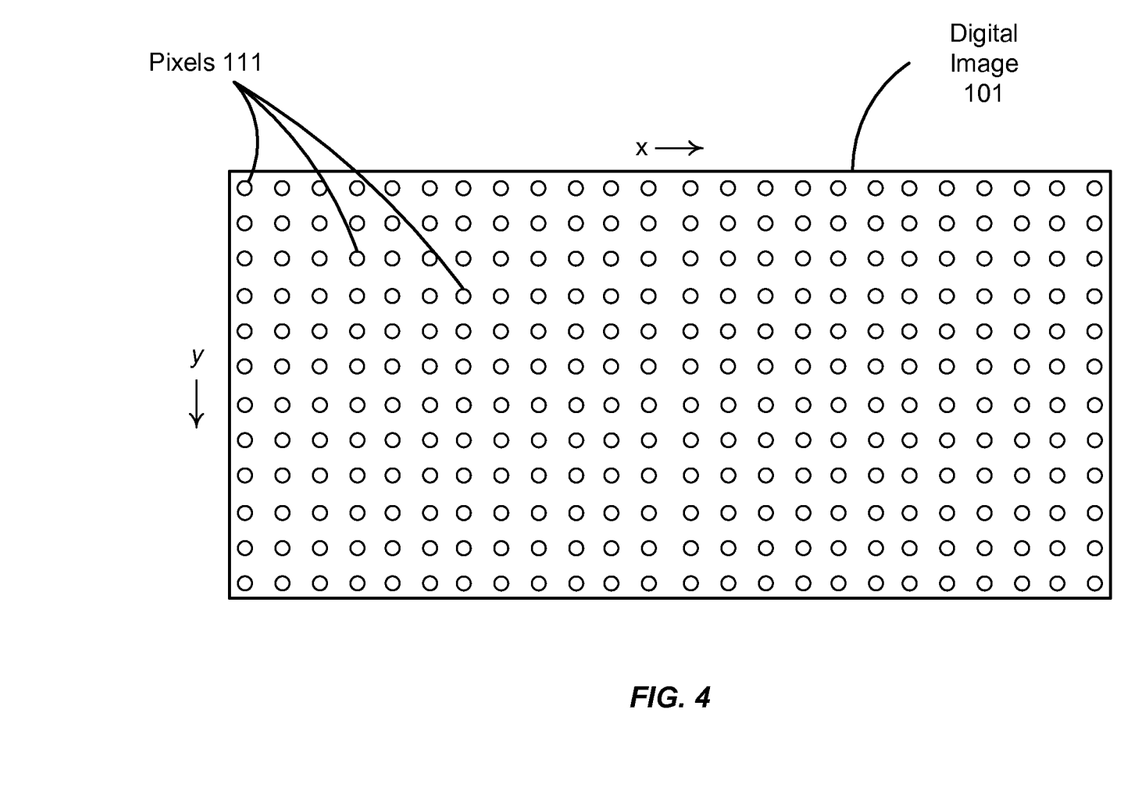
FIG. 4 illustrates an exemplary digital image.
Figure 5:
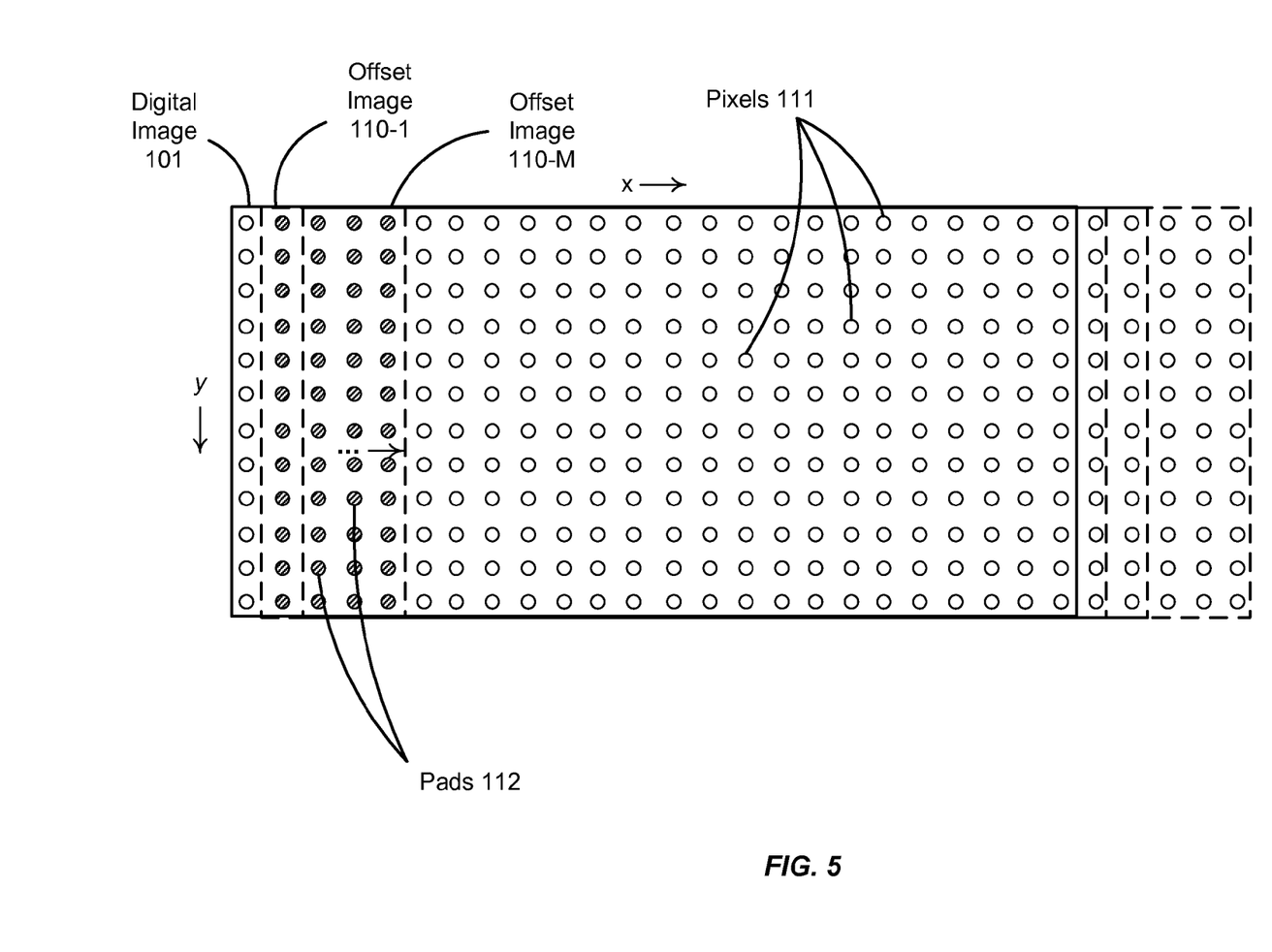
FIG. 5 illustrates offsetting the digital image of FIG. 4 to generate a plurality of exemplary offset images.

In FIG. 3, the processor 102 performs a pixelwise shift of the digital image 101 a number of times to generate a plurality of offset images, in the process element 301. For example, FIG. 4 illustrates an exemplary digital image 101 having a number of pixels 111 configured in a rectangular matrix as is generally the case. The total number of pixels 111 in the digital image 101 is thus the number of pixels in the horizontal (x) direction multiplied by the number of pixels 111 in the vertical (y) direction. FIG. 5 illustrates the digital image 101 being shifted a number of times in the x direction to generate a plurality of offset images 110-1-110-M. As the digital image 101 has a set x by y dimension, the offset images 110-1-110-M make up for the missing pixels with pads 112. For example, when the digital image 101 is shifted in the x direction by one pixel, it creates a column of missing pixels. That column is then filled with values to pad the column and generate an x by y dimension offset image 110. Each offset image 110 has a number of padded columns corresponding to a number of pixel shifts that the digital image 101 was shifted.

Figure 6:
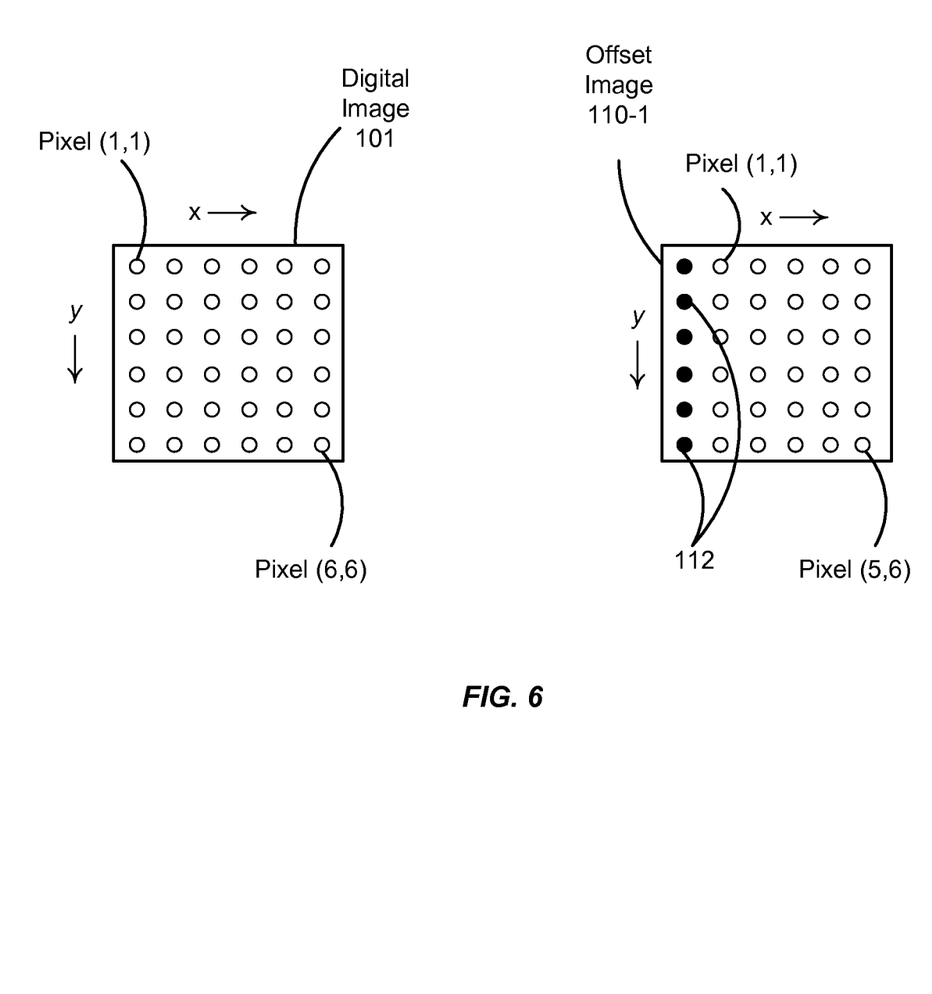
FIG. 6 illustrates an exemplary smaller scale version of an offset image.

Reference will be now made to a smaller scale version of the digital image 101 and a corresponding smaller scale version of a single offset image 110-1 to assist the reader in understanding certain computations. Although, the number of offset images 110 generated can and generally will be higher. FIGS. 6-9 illustrate the computations in a 6×6 pixel representation. In FIG. 6, the digital image 101 is shifted by one pixel in the x direction to produce an offset image 110-1. Thus, the original (x,y) corner pixel location (1,1) of the digital image 101 is shifted to the right along with the other pixels in the column leaving behind a blank column of pixels. The original pixel (5,6) now fills the location in the offset image 110-1 where the pixel (6,6) was previously occupied in the original digital image 101. The offset image 110-1 is padded with pixel values 112 to keep the offset image 110-1 as a 6×6 image. Generally, those padded pixel values 112 are simply zero values, although any value may be used as a matter design choice.

Figure 7:
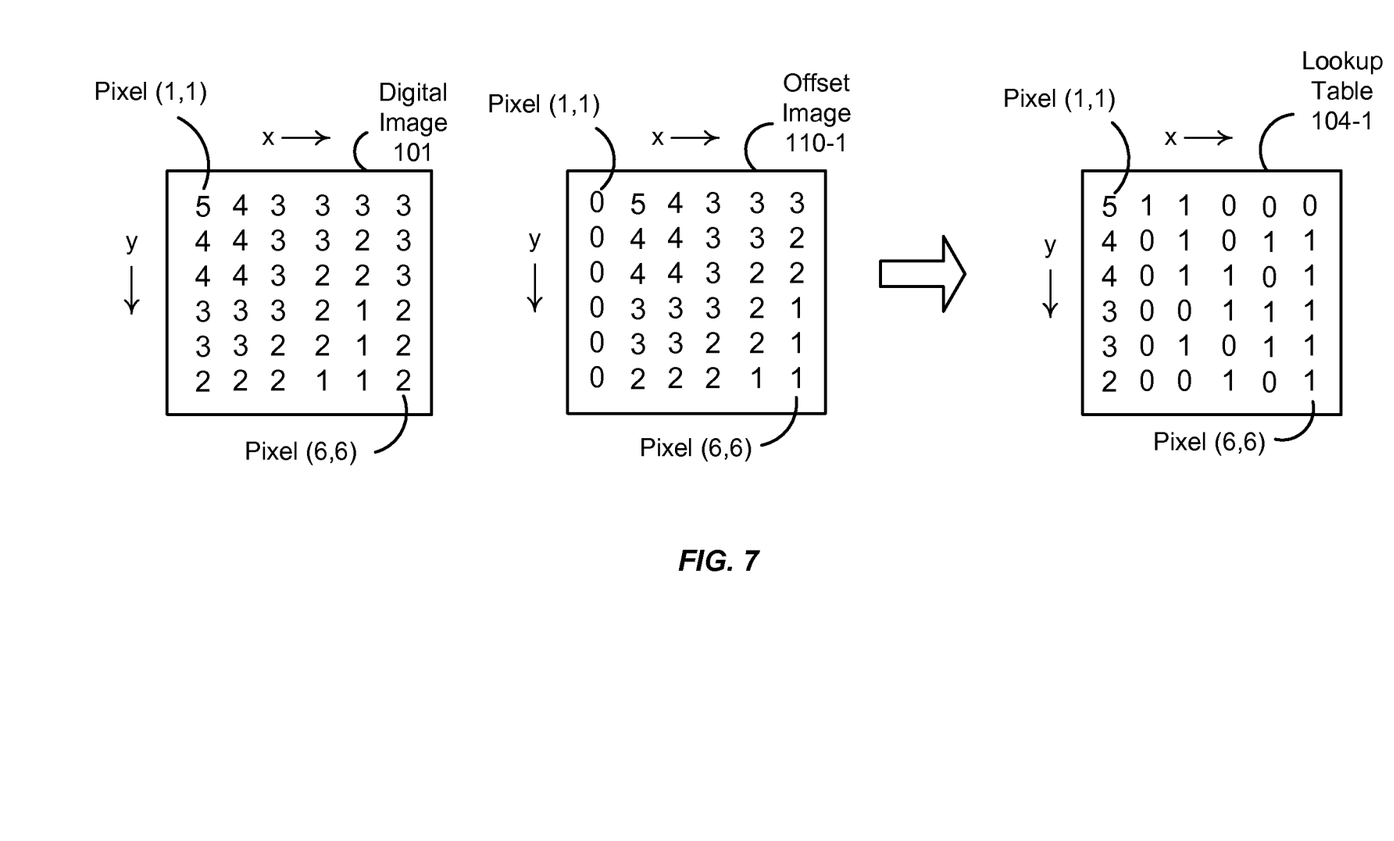
FIG. 7 illustrates an exemplary lookup table generated from the digital image and the offset image of FIG. 6.

With the offset image 110-1 generated, the offset image 110-1 can be compared to the original digital image 101 to determine difference values between the two images, in the process element 302. In FIG. 7, the digital image 101 is illustrated with exemplary pixel values (e.g., color values). The offset image 110-1, with its column of padded pixels 112 of "0", is compared to the digital image 101 on a pixel by pixel basis to determine a lookup table 104-1, in the process element 303. In this embodiment, the lookup table 104-1 is computed as an absolute value difference table. For example, the pixel (1,1) of the digital image 101 is subtracted from the pixel (1,1) of the offset image 110-1 to produce a value of "−5". That value is then squared and the square root is taken thereof to produce a positive value of "5" at the pixel location (1,1) in the lookup table 104-1 (i.e., an absolute value). Each pixel of the offset image 110-1 is compared to the corresponding pixel location of the original digital image 101 in similar fashion, thereby producing the lookup table 104-1. Alternatively, the lookup table 104 may be configured from squared pixel comparison values as a sum square difference table.

Figure 8:
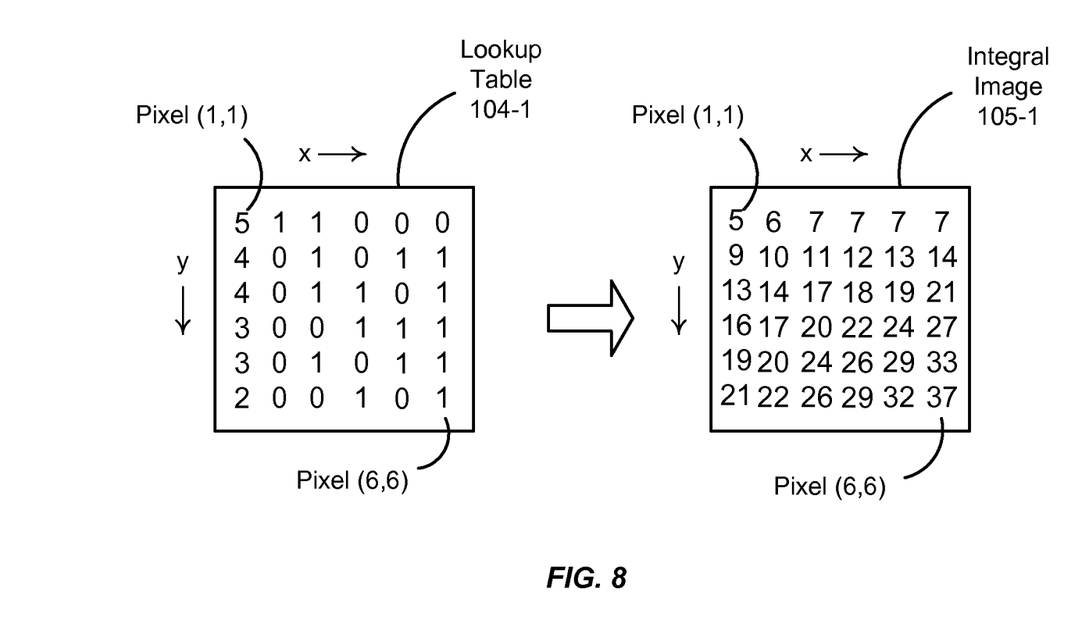
FIG. 8 illustrates an exemplary integral image generated from the lookup table of FIG. 6.

An integral image (also known as a summed area table) is generated from the lookup table 104-1, in the process element 304, as illustrated in FIG. 8. The integral image 105-1, in this embodiment, is generated by adding all previous pixel locations from any particular pixel location in the lookup table 104-1. More specifically, the value at any point (x, y) in the integral image 105-1 is the sum of all the pixels above and to the left of (x, y) in the lookup table 104-1. To illustrate, the pixel location (1,1) of the lookup table 104-1 has a value of "5". The sum of all previous pixel values from that location is still "5" as it is the only pixel value. The pixel location (1,2) in the lookup table 104-1 has a value of "4". Thus, its value in the integral image 105-1 is the sum of "4" plus "5", or "9". The (2,1) pixel location in the integral image 105-1 is the sum of "5" at (1,1) plus "1" at (2,1). The (2,2) pixel location in the integral image 105-1 has the sum of "0" plus "4" plus "1" plus "5", or "10. This process continues with all of the locations in the lookup table 104-1.

Figure 9:
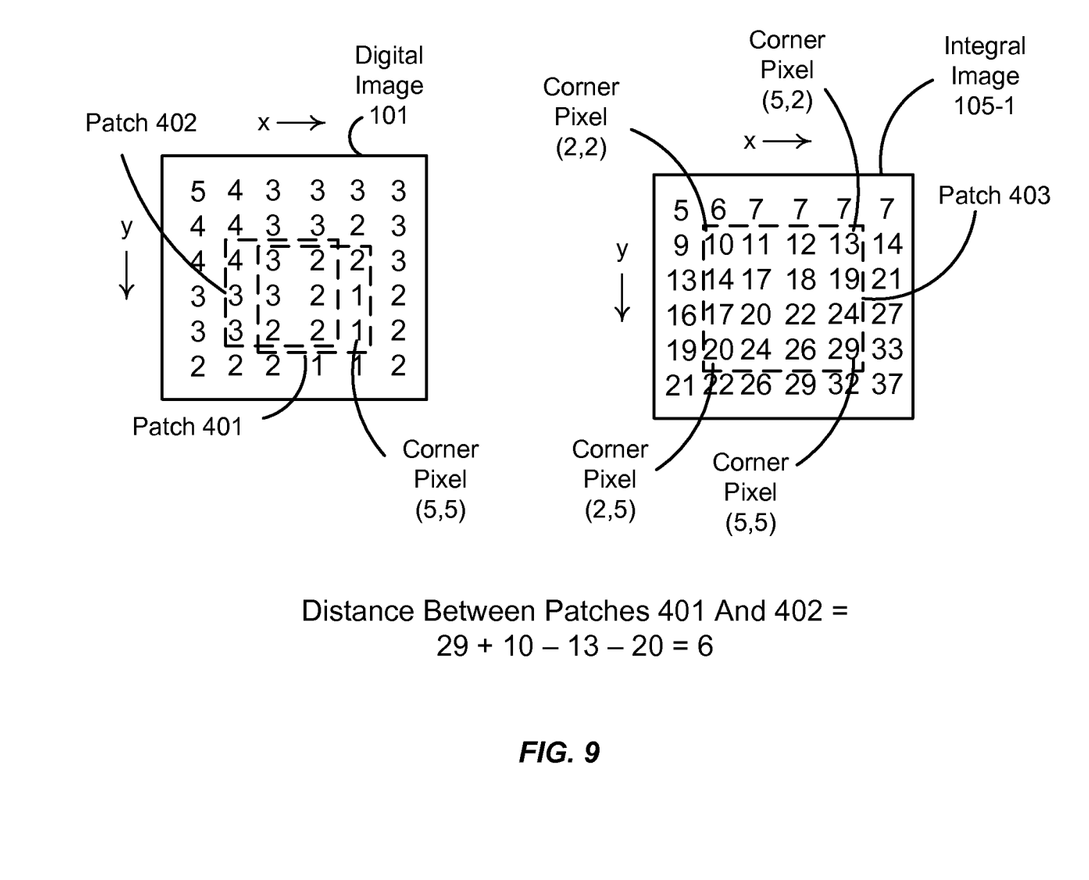
FIG. 9 illustrates an exemplary distance computation between patches in the integral image.

Once the integral image 105-1 is formed, the processor 102 can select the first patch of pixels from the digital image 101, in the process element 305, and a second patch of pixels in the digital image 101, in the process element 306, to determine a distance between the first and second patches, as illustrated with patches 401 and 402 in FIG. 9. For example, a patch of pixels 401 may be selected for denoising in the digital image 101. A patch 402 may be selected in the digital image 101 for processing the center pixel of the patch 401. To weight the patch 402 and its effect on the center pixel of the patch 401, the distance between the patch 401 and the patch 402 is first computed. This can be rapidly performed from arithmetic operations on the corner pixels of a patch 403 in the integral image 105-1, in the process element 307.

In this example, a patch 403 selected in the integral image 105-1 that corresponds to the patches 401 and 402 in the digital image 101. The patch 403 is a 4×4 patch of pixels corresponding to the (x,y) locations of the patches 401 and 402. To illustrate, the patches 401 and 402 overlap and occupy four pixels in the x direction, the longest length of pixels for the two patches. And, the selected patch 401 has a lowest far right corner at pixel location (5,5) in the digital image 101 that corresponds to the lowest far right corner at pixel location (5,5) in the integral image 105-1. A square patch 403 is configured from these locations/pixels. Then, to compute the distances between the two patches 401 and 402, arithmetic operations on the corner pixels at locations (2,2), (5,2), (2,5), (5,5) are performed as follows:

distance between patches 401 and 402=pixel value 29 at location (5,5)+pixel value 10 at location (2,2)−pixel value 13 at location (5,2)−pixel value 20 at location (2,5)=6.

Previously, a distance between the two patches 401 and 402 would have required 9 calculations of (4−3)+(3−2)+(2−2)+(3−3)+(3−2)+(2−1)+(3−2)+(2−2)+(2−1)=6. Accordingly, the techniques herein provide a substantial computational savings, particularly when images have pixel numbers in the millions.

From a more algorithmic perspective, the distance between any pair of patches (e.g., related by a k offset or pixel shift) can be computed by the addition and subtraction of corner pixels of a patch in an integral image 105. Given a center pixel of a patch of the digital image 101 and an offset image 110, the distance between any two patches of the digital image 101 can be computed from corresponding patch in the integral image 105 as (x−hps, y−hps)+(x+hps, y+hps)+(x+hps, y−hps)+(x−hps, y+hps), where "lips" is the "half patch size". The half patch size in this example is "3" divided by "2" (i.e., half) with the remainder being removed and, therefore, "1". The distance can also be equivalently computed by simply using the search patch 402 as the reference patch and looking up the lookup table 104 corresponding to the offset image 110 opposite to k.

These distance calculations provide a more efficient manner in computing weights for the above denoising algorithm. To further illustrate, given the digital image 101 and a set of possible patch offsets $t_k$, with k being equal to 1, 2, ... M, one would initialize a result buffer R in the image processing system 100 to "0" and also initialize a "weight sum" to "0". Then, for each offset k, the lookup table 104 would be created that temporarily stores the pairwise squared pixel difference (or other kinds of distance measure) in the digital image 101. Then, an integral image 105 is generated from each lookup table 104 and a patch distance map $D_k$ (i.e., the same size as the digital image 101) is computed from each integral image 105. Each pixel in the distance map $D_k$ indicates a distance of a patch centering on the pixel (e.g., patch 401) to the patch with the current offset (e.g., patch 402). Then, a weight map $W_k$ (also the same size as the digital image 101) would be computed from the distance map $D_k$ using a mapping function $\exp(-\alpha \cdot D_k)$, where $\alpha$ is $$\frac{1}{(2\sigma^2)}$$

and $\sigma$ is a user parameter gauging a noise variance. The weight map $W_k$ is then multiplied by the shifted offset image 110 (i.e., corresponding to its offset value k) and added to the result buffer R. The weight sums (weightsum) are accumulated for each offset and then returned as R=R/weightsum.

This process is more memory efficient because it uses a buffer for each integral image 105, its corresponding weight map $W_k$, and the result R as opposed to computing every distance for every weight each time. As the memory footprint is significantly smaller, the processing can be performed on devices with less computing resources, such as portable devices (e.g., smart phones, tablet computers, etc.). Moreover, the processing becomes more energy-efficient because there are fewer memory accesses.

Again, those skilled in the art should readily recognize that FIGS. 3-9 are merely intended to provide rudimentary examples to aid in the understanding of the inventive aspects herein. The invention is not intended be limited to any number of pixels, generated lookup tables 104, generated integral images 105, selected patches, or the like. Generally, the patch-based processing that would implement the inventive aspects of the image processing system 100 would operate on digital images having substantially more pixels than those illustrated (e.g., images with millions of pixels). Accordingly, the number of patches, integral images 105, and lookup tables 104 selected to operate on such images may also be substantially larger.

Moreover, the invention is not intended to be limited to the type of lookup tables 104. The lookup tables 104 can be generated in a variety of ways as a matter of design choice for either grayscale (monochrome) images or color images. For example, a lookup table 104 may be generated as a square of pixel differences based on comparisons of corresponding (x,y) pixel locations between the digital image 101 and an offset image 110. Such may be implemented as $[(x_{101}, y_{101}) - (x_{110}, y_{110})]^2$, where $(x_{101}, y_{101})$ is a pixel location in a grayscale digital image 101 and $(x_{110}, y_{110})$ is a corresponding pixel location in the offset image 110. In a red-green-blue (RGB) color image 101, the calculation may be implemented as $[R(x_{101}, y_{101}) - R(x_{110}, y_{110})]^2 + [G(x_{101}, y_{101}) - G(x_{110}, y_{110})]^2 + [B(x_{101}, y_{101}) - B(x_{110}, y_{110})]^2$, where $R(x_{101}, y_{101})$ equals the red color value at a pixel location in the image 101 and $R(x_{110}, y_{110})]^2$ equals the red color value at a corresponding pixel location in the offset image 110, with "G" and "B" being the corresponding green and blue color values at those pixel locations. Alternatively, absolute values of pixel differences may be computed as $|(x_{101}, y_{101}) - (x_{110}, y_{110})|$ for grayscale images and as $|R(x_{101}, y_{101}) - R(x_{110}, y_{110})| + |G(x_{101}, y_{101}) - G(x_{110}, y_{110})| + |B(x_{101}, y_{101}) - B(x_{110}, y_{110})|$ for RGB color images. Similar computations could be made for CMYK (Cyan, Magenta, Yellow, and blacK) and other color spaces. Those skilled in the art should also recognize that the subtraction of pixel values may be done in either order (e.g., digital image 101 minus offset image 110 or vice versa) and that any arithmetic operation discussed herein is not intended to limit the invention. Rather, it is merely intended to assist the reader in understanding the inventive concepts described herein.

What is claimed is:

1. A method of removing noise from a digital image, the method comprising:
   generating a plurality of lookup tables of pixel values based on comparisons of the digital image to a plurality of offset images that are pixelwise shifted images of the entire digital image;
   generating integral images from the lookup tables;
   computing distances to patches of pixels in the digital image from the integral images;
   computing weights for the patches of pixels in the digital image based on the computed distances;
   multiplying the computed weights by respective offset values of the plurality of offset images; and
   applying the weights to pixels in the digital image on a patch-by-patch basis to restore values of the pixels.

2. The method of claim 1, further comprising:
   pixelwise shifting the digital image to generate the plurality of offset images of the digital image; and
   comparing the digital image to the plurality of offset images of the digital image to generate the lookup tables.

3. The method of claim 1, wherein generating at least one of the lookup tables comprises:
   subtracting pixel values at pixel locations in the digital image from pixel values at corresponding pixel locations in one offset image of the plurality of offset images; and
   obtaining absolute values for each subtraction to generate the at least one lookup table.

4. The method of claim 1, wherein generating at least one of the lookup tables comprises:
   subtracting pixel values at pixel locations in the digital image from pixel values at corresponding pixel locations in one offset image of the plurality of offset images; and
   squaring each subtraction to generate the at least one lookup table with squared difference values.

5. The method of claim 1, wherein computing the distances comprises:
   arithmetically operating on values at corner pixels of a patch in the integral image.

6. The method of claim 1, wherein applying the weights to the pixels in the digital image on a patch-by-patch basis comprises:
   processing the digital image via a non-local means denoising algorithm.

7. The method of claim 1, wherein applying the weights to the pixels in the digital image on a patch-by-patch basis comprises:
   processing the digital image via a BM3D denoising algorithm.

8. The method of claim 1, further comprising:
   storing the computed distances for reuse in subsequent weight computations.

9. The method of claim 1, wherein:
   each of the offset values represent a pixel value in a pixelwise shifted image; and
   the multiplying is performed by multiplying each of the computed weights by a corresponding pixel value in a corresponding offset image of the plurality of offset images.

10. A processing system operable to remove noise from a digital image, the processing system comprising:
    a processor operable to generate a plurality of lookup tables of pixel values based on comparisons of the digital image to a plurality of offset images that are pixelwise shifted images of the entire digital image, to generate integral images from the lookup tables, to compute distances between patches of pixels in the digital image from the integral images, to compute weights for the patches of pixels in the digital image based on the computed distances, to multiply the computed weights by respective offset values of the plurality of offset images, and to apply the weights to pixels in the digital image on a patch-by-patch basis to restore values of the pixels.

11. The processing system of claim 10, wherein the processor is further operable to:
    pixelwise shift the digital image to generate the plurality of offset images of the digital image; and
    compare the digital image to the plurality of offset images of the digital image to generate the lookup tables.

12. The processing system of claim 10, wherein the processor is further operable to:
    subtract pixel values at pixel locations in the digital image from pixel values at corresponding pixel locations in one offset image of the plurality of offset images; and
    obtain absolute values for each subtraction to generate at least one of the lookup tables.

13. The processing system of claim 10, wherein the processor is further operable to:
    subtract pixel values at pixel locations in the digital image from pixel values at corresponding pixel locations in one offset image of the plurality of offset images; and
    square each subtraction to generate at least one of the lookup tables with squared difference values.

14. The processing system of claim 10, wherein the processor is further operable to:
    arithmetically operate on values at corner pixels of a patch in the integral image.

15. The processing system of claim 10, wherein the processor is further operable to:
   process the digital image via a non-local means denoising algorithm to apply the weights to pixels in the digital image on a patch-by-patch basis.

16. The processing system of claim 10, wherein the processor is further operable to:
   process the digital image via a BM3D denoising algorithm to apply the weights to pixels in the digital image on a patch-by-patch basis.

17. The processing system of claim 10, wherein the processor is further operable to:
   store the computed distances for reuse in subsequent weight computations.

18. The processing system of claim 10, wherein:
   each of the offset values represent a pixel value in a pixelwise shifted image; and
   to said multiply, the processor is operable to multiply each of the computed weights by a corresponding pixel value in a corresponding offset image of the plurality of offset images.

19. A non-transitory computer readable medium comprising instructions that, when executed by a processor, are operable to direct the processor to:
   generate a plurality of lookup tables of pixel values based on comparisons of the digital image to a plurality of offset images that are pixelwise shifted images of the entire digital image;
   generate integral images from the lookup tables;
   compute distances between patches of pixels in the digital image from the integral images;
   compute weights for the patches of pixels in the digital image based on the computed distances;
   multiply the computed weights by respective offset values of the plurality of offset images; and
   apply the weights to pixels in the digital image on a patch-by-patch basis to restore values of the pixels.

20. The computer readable medium of claim 19, further comprising instructions that direct the processor to:
   pixelwise shift the digital image to generate the plurality of offset images of the digital image; and
   compare the digital image to the plurality of offset images of the digital image to generate the lookup tables.

21. The computer readable medium of claim 19, further comprising instructions that direct the processor to:
   arithmetically operate on values at corner pixels of a patch in the integral image.

22. The computer readable medium of claim 19, further comprising instructions that direct the processor to:
   process the digital image via a non-local means denoising algorithm to apply the weights to pixels in the digital image on a patch-by-patch basis.

23. The computer readable medium of claim 19, further comprising instructions that direct the processor to:
   process the digital image via a BM3D denoising algorithm to apply the weights to pixels in the digital image on a patch-by-patch basis.

24. The computer readable medium of claim 19, further comprising instructions that direct the processor to:
   store the computed distances for reuse in subsequent weight computations.

25. The computer readable medium of claim 19, wherein the processor is operable within a mobile device.

* * * * *